United States Patent [19]
Weiters

[11] 3,937,486
[45] Feb. 10, 1976

[54] TIP OVER CONTROL FOR THREE WHEELED VEHICLES

[76] Inventor: Albert W. Weiters, 7438 Baker Ave.,NE. Fridley Terrace, Minneapolis, Minn. 55432

[22] Filed: Aug. 22, 1974

[21] Appl. No.: 499,438

[52] U.S. Cl............ 280/87 R; 280/263; 280/112 A; 280/282
[51] Int. Cl.² ...................... B62K 5/04; B62K 5/08
[58] Field of Search .......... 280/263, 269, 270, 277, 280/284, 285, 286, 288, 62, 92, 93, 87 R, 1.202, 1.203, 1.204

[56] References Cited
UNITED STATES PATENTS

| | | | |
|---|---|---|---|
| 776,078 | 11/1904 | Murphy | 280/87 R |
| 2,696,387 | 12/1954 | Nordin | 280/263 |
| 2,812,194 | 11/1957 | Ajero | 280/263 |
| 3,237,961 | 3/1966 | McMullen | 280/263 |
| 3,645,558 | 2/1972 | McMullen | 280/87 R |

Primary Examiner—Leo Friaglia
Assistant Examiner—Jack D. Rubenstein
Attorney, Agent, or Firm—J. R. Cwayna

[57] ABSTRACT

A structure for three wheeled vehicles such that when the front handle bars are turned either the frame will be tilted in the direction of the turn or the wheels will be tilted parallely into the direction of the turn by providing in one form a means for rotatably mounting the frame upon a solid rear axle of the vehicle and in a second form by providing means to shift a pair of independent rotatably mounted axles to permit the wheels to be directed into the direction of the turn. In either situation the turning of the handle bars and the front wheel controls the attitude of the frame or the attitude of the wheels such that the unit will more easily corner or turn and thus decrease the possibility of tipping over.

6 Claims, 8 Drawing Figures

TIP OVER CONTROL FOR THREE WHEELED VEHICLES

AREA OF THE INVENTION

The present invention relates to a mechanism for tilting either the frame of a three wheeled vehicle or shifting the attitude of the rear wheels of a three wheeled vehicle to prevent or to decrease the tendency of the unit to overturn when rounding a corner.

BACKGROUND of the INVENTION

The applicant has found minimal background art regarding this invention with the exception of a U.S. Pat. No. 3,645,558 which provides a shifting frame mechanism for a three wheeled vehicle which shifting will occur upon the turning of the front wheel of the vehicle. In riding three wheeled vehicles, such as small tricycles, a child will often, even though the vehicle is relatively stable in its present condition, tend to, due to the forces involved, tip the vehicle outwardly as he turns a corner. The basic concept of applicant's invention is to eliminate or at least decrease this tipping probability by an automatic shifting of the frame of the vehicle or the rear wheels of the vehicle to counteract the forces that build when a corner is turned.

OBJECTS AND SUMMARY OF THE INVENTION

The present invention provides a means for either providing a solid axle and pivotally mounting the frame of a tricycle or three wheeled vehicle thereon which frame will be rotated upon the axle when the front wheel is turned. In another form of the invention, the rear wheels of the vehicle are pivotally mounted upon the frame and these rear wheels will be shifted in vertical attitude when the front wheel is turned. In either instance a counteracting arrangement, either through a shift of the center of gravity or a counteracting friction force when the vehicle is turned as in turning a corner is provided.

The object of the invention is to provide a tip over control for three wheeled vehicles such as tricycles and the like.

Another object of the invention is to provide means for automatically tilting the frame of a three wheeled vehicle when the front wheel is turned as in rounding a corner.

It is a further object of the invention to provide a means for shifting the attitude of the rear wheels of a three wheeled vehicle upon turning of the front wheel thereof which attitude shifting will result in a counteracting force to the normal forces tending to overturn the vehicle.

These and other objects and advantages of the invention will more fully appear from the following description made in connection with the accompanying drawings in which the same numeral is used to designate the same or similar parts throughout the several views, and in which.

Figure 1:
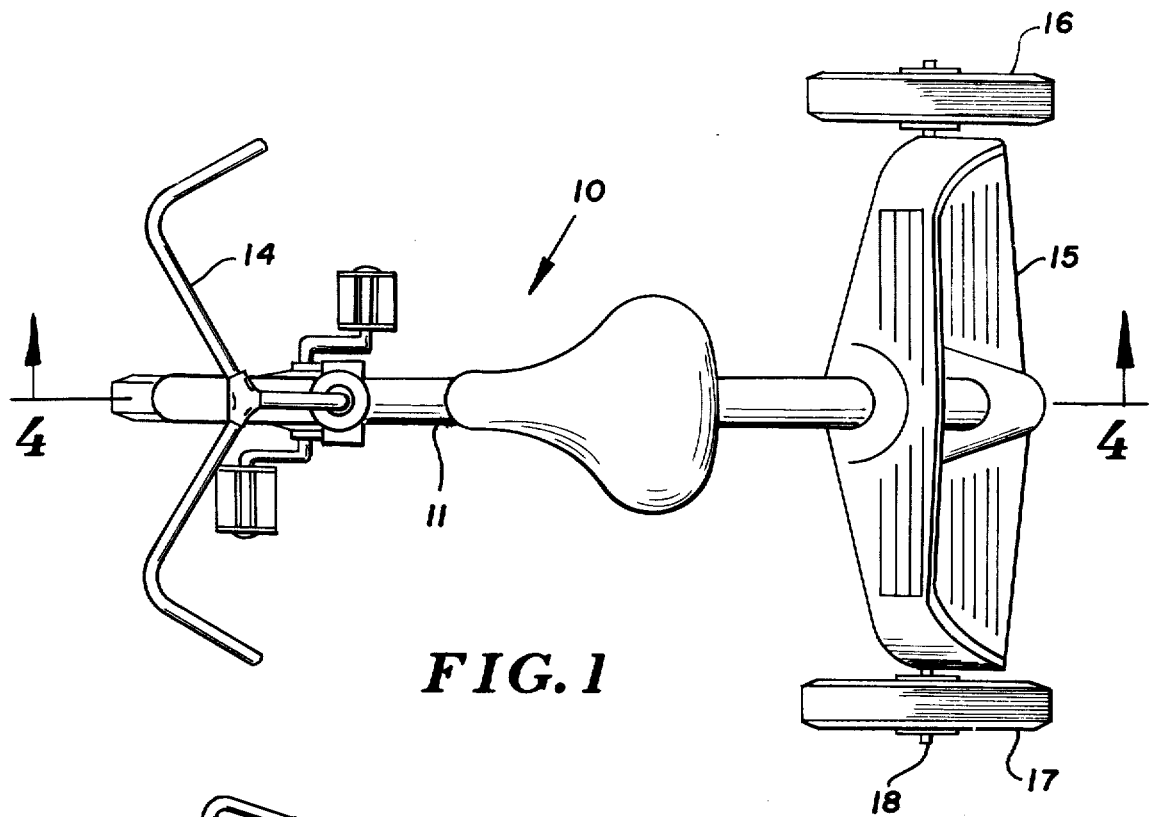
FIG. 1 is a top plan view of a three wheeled vehicle upon which applicant's concept has been provided.
Figure 2:
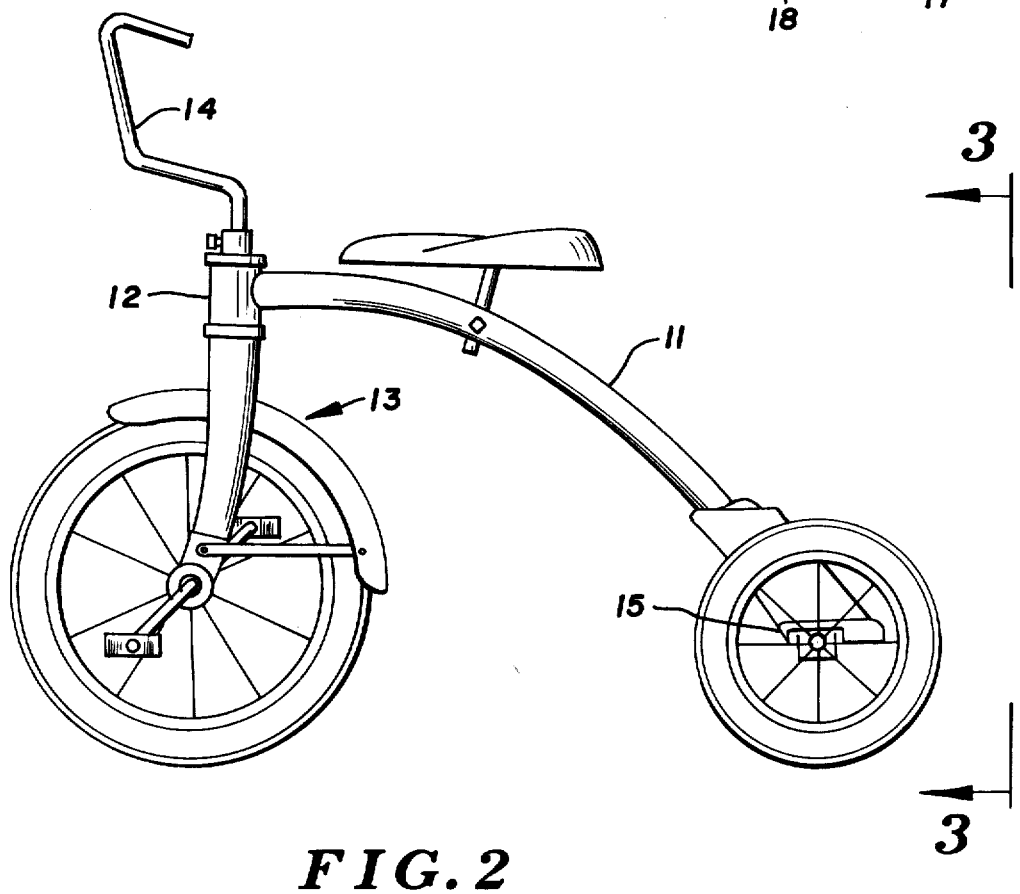
FIG. 2 is a side elevation taken from FIG. 1.

In accordance with the accompanying drawings, applicant's invention is installed upon a child's three wheeled tricycle generally designated 10 which includes a frame structure 11 normally consisting of a unitary curved bar member extending from an upper neck 12 which provides a rotatable mounting for the front wheel assembly 13 and having handle bars 14 extending upwardly therefrom with a foot rest and rear laterally extending frame structure 15 arranged on the lower portion of the bar member 11 which lower frame structure 15 normally provides a mounting arrangement for a pair of wheels 16, 17 arranged on an axle 18 mounted upon the laterally extending frame portion 15. The normal construction of a tricycle is well known in the art and it is commonly known that the frame member 11 is of a hollow construction and this will permit the passage of control members therethrough as are necessary with applicant's invention. Normally a three wheeled vehicle such as this tricycle will have its stability dictated by the skill of the rider but with applicant's modifications to such a vehicle, the skill of the rider, although being a factor in controlling the vehicle, will be aided by the shifting of the frame of the vehicle or by shifting of the attitude of the wheels of the vehicle.

In the first form of the invention, the frame of the vehicle is shifted whenever the front wheel is rotated. This particular structural situation is provided and illustrated in FIGS. 5 and 6 in which a solid rear axle 20 is provided and the wheels (not shown) are mounted on the ends of this axle. The axle is mounted for rotation upon the rear frame member 15 by providing a first mounting plate 21 extending downwardly from the frame and providing an upwardly extending plate from the axle 20 with a pin member 23 rotatably joining the same such that the axle 20 will be free to pivot about this pin member 23. A second pair of pivotal mounts 24, 25 are arranged on the lower portion of the frame 15 and a pair of lever elements 26, 27 are pivotally mounted therein through pin members 28, 29. These lever members 26, 27 are rotatably attached to the axle 20 at one end 26a, 27a thereof to control the attitude of the frame with respect to the axle 20.

Figure 3:
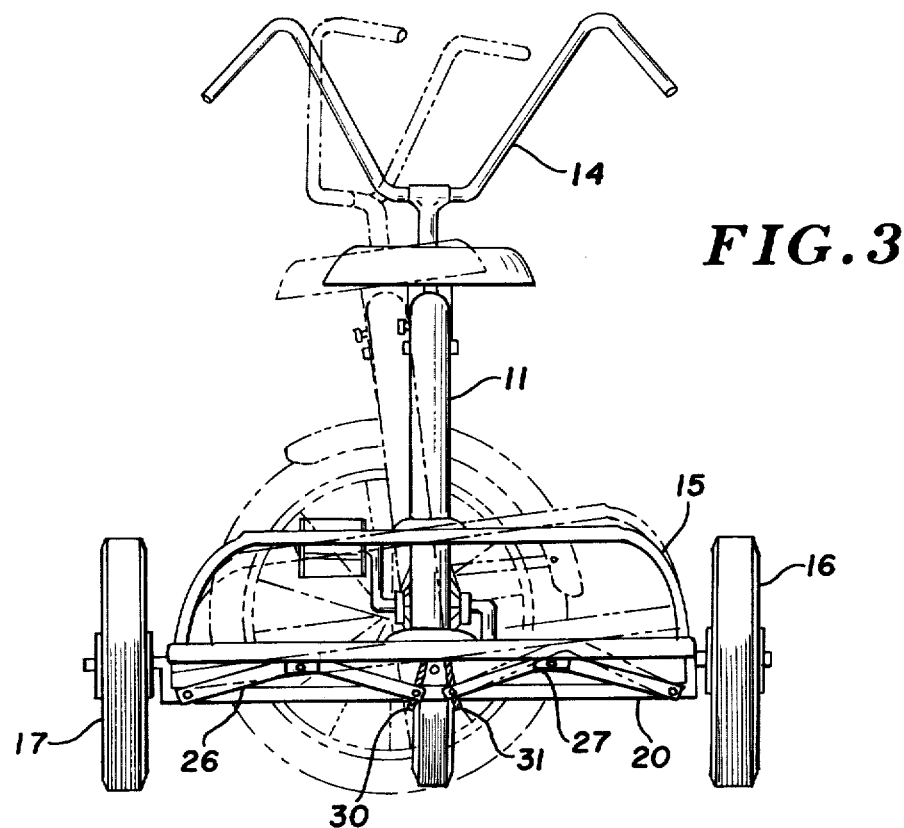
FIG. 3 is a rear elevation of the tricycle illustrated in FIG. 1 and showing in dotted lines the frame shifting capabilities of the first form of the invention.
Figure 4:
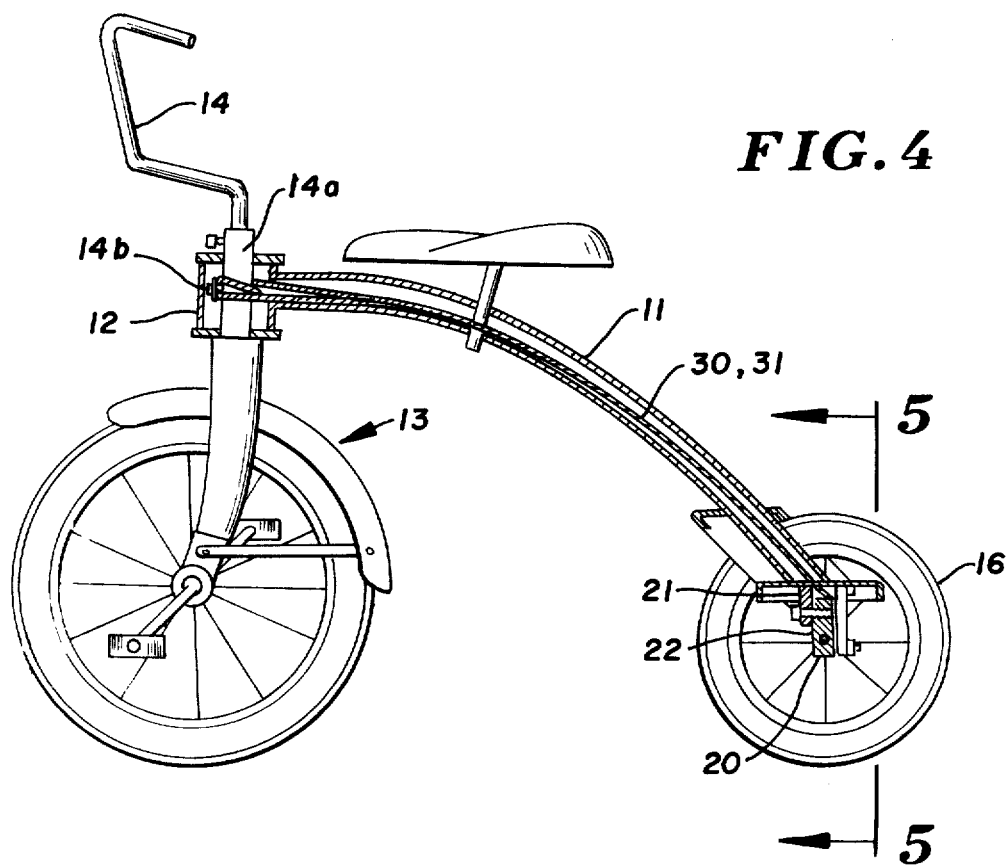
FIG. 4 is a vertical cross section taken substantially along Line 4—4 of FIG. 1.

Means for shifting this linkage 26, 27 arrangement and therefore the frame 11 of the tricycle with respect to the rear axle 20 thereof takes the form of a pair of control cables 30, 31 which are attached to the inner ends 26b, 27b of the links and which extend upwardly through the frame 11 to the front neck portion 12 thereof. At this neck portion, these cables are wound around the front fork upwardly extending member 14a and are secured thereto by a fastening device 14b to prevent slipage thereof. The idea and concept of this steering mechanism is to provide a certain amount of wraps of the cables 30, 31 about the neck portion 14a such that as the handle bars 14 are turned, one of the cables will wrap about this neck portion 14a while the other cable will loosen, being unwrapped from this neck portion 14a. This motion will then draw one of the links 26 or 27 upwardly and this upward movement of one of the links will allow the other link to be moved downwardly and therefore the frame 15 be shifted upon the axle 20. This particular shifting is illustrated in FIG. 3 where the frame 11 has been illustrated as being tilted from its normal verticle position.

Figure 5:
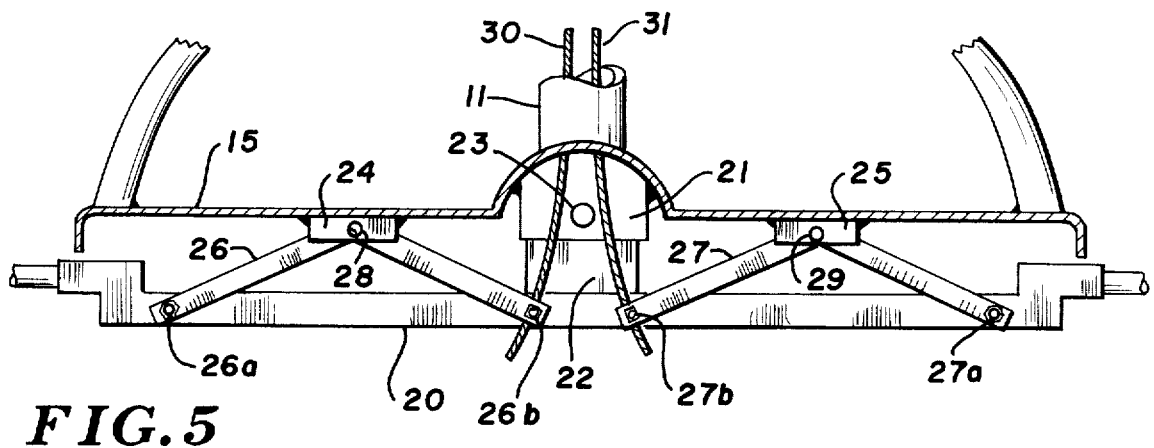
FIG. 5 is a vertical section taken substantially along Line 5—5 of FIG. 4 and illustrating the first form of the invention in which the frame is provided in a tiltable manner.
Figure 6:
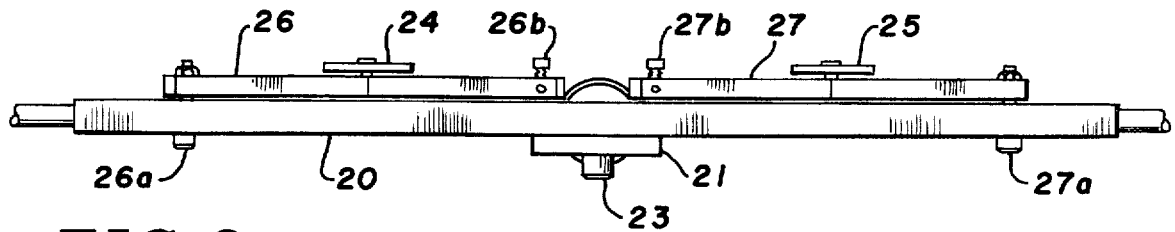
FIG. 6 is a bottom plan view taken from FIG. 5.
Figure 7:
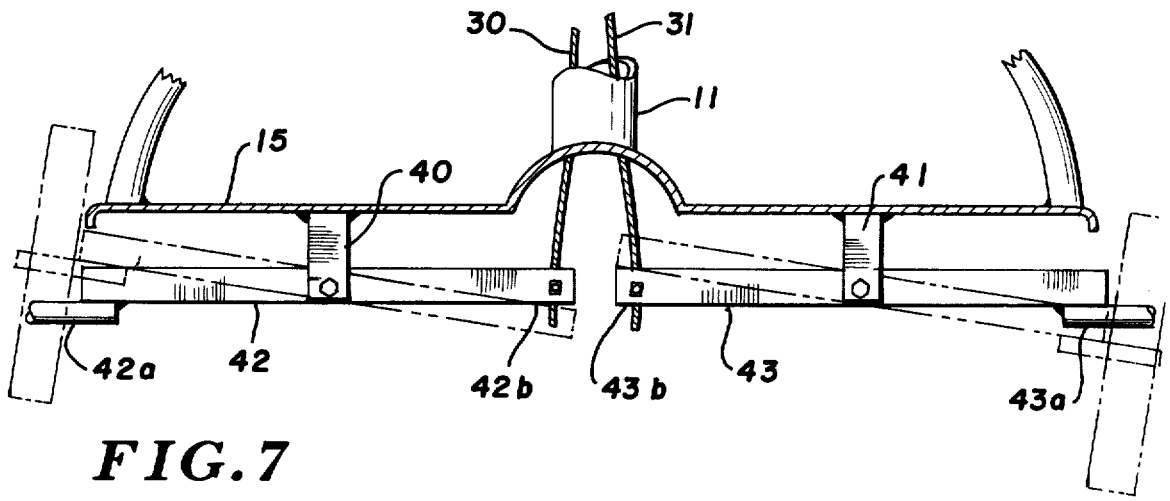
FIG. 7 is a vertical section taken substantially along Line 5—5 of FIG. 4 but illustrating a second form of the invention in which the wheel attitude is shifted; and, FIG. 8 is a bottom plan view taken substantially from FIG. 7.
Figure 8:
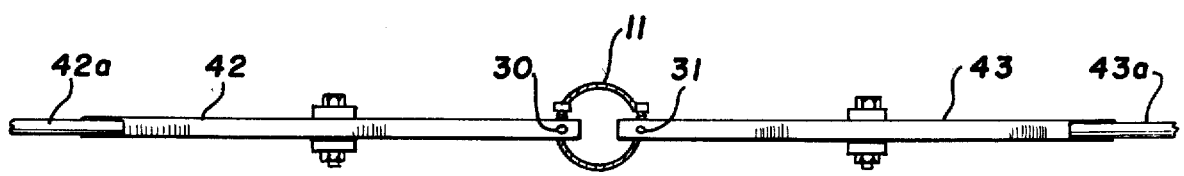

The second form of the invention is particularly illustrated in FIGS. 7 and 8. Again, in these views, the laterally extending frame or foot rest 15 structure is provided and the arcuate upwardly extending frame tube 11 is provided thereon. In this particular form a pair of mounting members 40, 41 are provided on the frame 15 in outwardly spaced relation from the tubular frame section 11 and a pair of individual axle members 42, 43 are pivotally mounted on the mounting elements 40, 41. The wheels are mounted on axle portions 42a, 43a thereof and the inner ends 42b, 43b thereof are provided with attachment elements for attaching the control cables 30, 31 thereto. In this particular form, when the front wheel assembly 13 is turned by the handle bars 14 the individual axles will be moved as shown in the dotted lines of FIG. 7 to shift the vertical attitude of the wheels attached to the axles 42a, 43a to tilt the same in the direction of the turn. The independent axles permit this type of shifting as compared to the solid axle structure as illustrated in FIGS. 5 and 6. In the form shown in FIGS. 7 and 8, the wheels will tilt with regard and with respect to the frame 15 rather than the frame 15 being tilted with respect to a pair of commonly mounted wheels.

Both forms of the invention are provided to provide a counteracting effect to the forces exerted when a child turns his tricycle such that a higher degree of stability is provided thereto. In either of the forms, the frame tilting and the wheel attitude is controlled strictly by the turning of the handle bars 14 and the control cables 30, 31 mounted thereabout which will permit one of the cables to be shortened while the other is being lengthened.

The objects of the invention are to provide a tip over control mechanism for three wheeled vehicles and although the illustrations are primarily directed to a child's tricycle, it should be obvious that these same principles could be applied to any three wheeled unit.

What is claimed is:

1. A tip over control for three wheeled vehicles, which vehicles include a front, rotatable steering wheel assembly, a frame assembly including a rearwardly positioned laterally extending frame portion, said control including:
    a. a rear axle pivotally connected, for movement about the longitudinal axis of the vehicle generally centrally to the lateral frame portion permitting the frame to shift relative to said axle;
    b. wheels rotatably mounted on the respective ends of said axle;
    c. linkage means including cable means having its ends operatively attached respectively to said axle on laterally spaced portions thereof and having its midsection wrapped about the steering assembly whereby the effective length of the cable means from said midsection to one of its axle connections will be lengthened when the steering assembly is rotated in one direction while the effective length of said cable means from its midsection to the other of its connections is shortened whereby the frame is shifted with respect to said axle upon rotation of the steering assembly said linkage means including:
        1. a pair of lever elements rotatably mounted at their midpoints to the laterally extending frame portion and spaced outwardly from said axle connection;
        2. the outer ends of said levers being attached to said axle; and,
        3. said cable means being connected to the inner ends of said levers.

2. The structure set forth in claim 1 and said cable means including a pair of cables each having one end thereof attached to the steering assembly and having the other end operatively attached to said axle on laterally spaced portions thereof.

3. The structure set forth in claim 2 and said cable passing interiorially of said frame assembly.

4. A tip over control for three wheeled vehicles, which vehicles include a front, rotatable steering wheel assembly, a frame assembly including a rearwardly positioned laterally extending frame portion, said control including:
    a. a pair of laterally and oppositely extending rear axle members rotatably connected respectively generally at their midpoints to laterally spaced portions of the laterally extending frame;
    b. wheel members rotatably arranged on the outer ends of said axle members;
    c. means for simultaneously controlling the position of said axles and thereby said wheels including linkage means extending from said rotatable steering wheel assembly to the inner ends of said levers to shift the same upon rotation of said wheel assembly.

5. The structure set forth in claim 4 and said linkage means including cable means connected at one end thereof to said inner lever ends with the other end thereof connected to said steering wheel assembly for tightening of one of said cables when the steering assembly is rotated in one direction and loosening of the other cable simultaneously therewith.

6. The structure set forth in claim 5 and said cable passing interiorially of said frame assembly.

* * * * *

UNITED STATES PATENT OFFICE
CERTIFICATE OF CORRECTION

Patent No. 3,937,486            Dated February 10, 1976

Inventor(s) Albert W. Wieters

It is certified that error appears in the above-identified patent and that said Letters Patent are hereby corrected as shown below:

On the Title page, in item [76] "Albert W. Weiters" should read -- Albert W. Wieters --.

Signed and Sealed this eighteenth Day of May 1976

[SEAL]

*Attest:*

RUTH C. MASON
*Attesting Officer*

C. MARSHALL DANN
*Commissioner of Patents and Trademarks*